United States Patent [19]

Quenneville et al.

[11] Patent Number: 4,611,960
[45] Date of Patent: Sep. 16, 1986

[54] TOOL HOLDER

[75] Inventors: Raymond N. Quenneville, Suffield; Harry H. Mayne; Kenneth H. Sickler, both of Simsbury, all of Conn.

[73] Assignee: The Jacobs Manufacturing Company, Bloomfield, Conn.

[21] Appl. No.: 694,965

[22] Filed: Jan. 25, 1985

[51] Int. Cl.⁴ .............................................. B23B 31/10
[52] U.S. Cl. ................... 409/234; 269/241; 279/18; 279/67
[58] Field of Search .................... 409/234; 279/16, 17, 279/18, 66, 67; 269/241

[56] References Cited

U.S. PATENT DOCUMENTS

| 335,009 | 1/1886 | Barnes | 279/18 |
| 715,252 | 12/1902 | Errington | 279/18 |
| 942,304 | 12/1909 | Bomborn | 279/18 |
| 2,324,130 | 7/1943 | Beckwith | 279/18 |
| 4,437,801 | 3/1984 | Lewis | 409/234 |

FOREIGN PATENT DOCUMENTS

| 446072 | 11/1912 | France | 279/67 |
| 256623 | 2/1949 | Switzerland | 269/241 |
| 23111 | 3/1901 | United Kingdom | 279/66 |

Primary Examiner—Gil Weidenfeld
Assistant Examiner—Daniel W. Howell
Attorney, Agent, or Firm—Donald E. Degling

[57] ABSTRACT

A tool holder of the two-jaw type is provided which has the centering accuracy and gripping power of a three-jaw geared chuck. The tool holder includes a body having ways formed by a polygonal passageway which is perpendicular to the central axis of the tool holder body. The jaw mechanism includes a differential screw which mates, on one end, with the body of the tool holder and, on the other end, with a pair of anvil pieces. The face of the differential screw and the anvil pieces move toward and away from the central axis of the tool holder along the ways formed by the polygonal passageway and provide the tool-gripping means.

22 Claims, 11 Drawing Figures

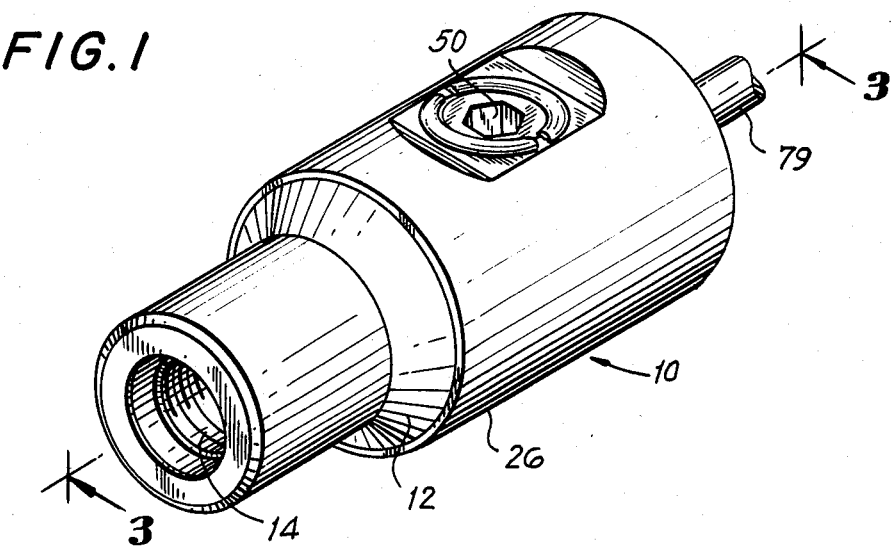
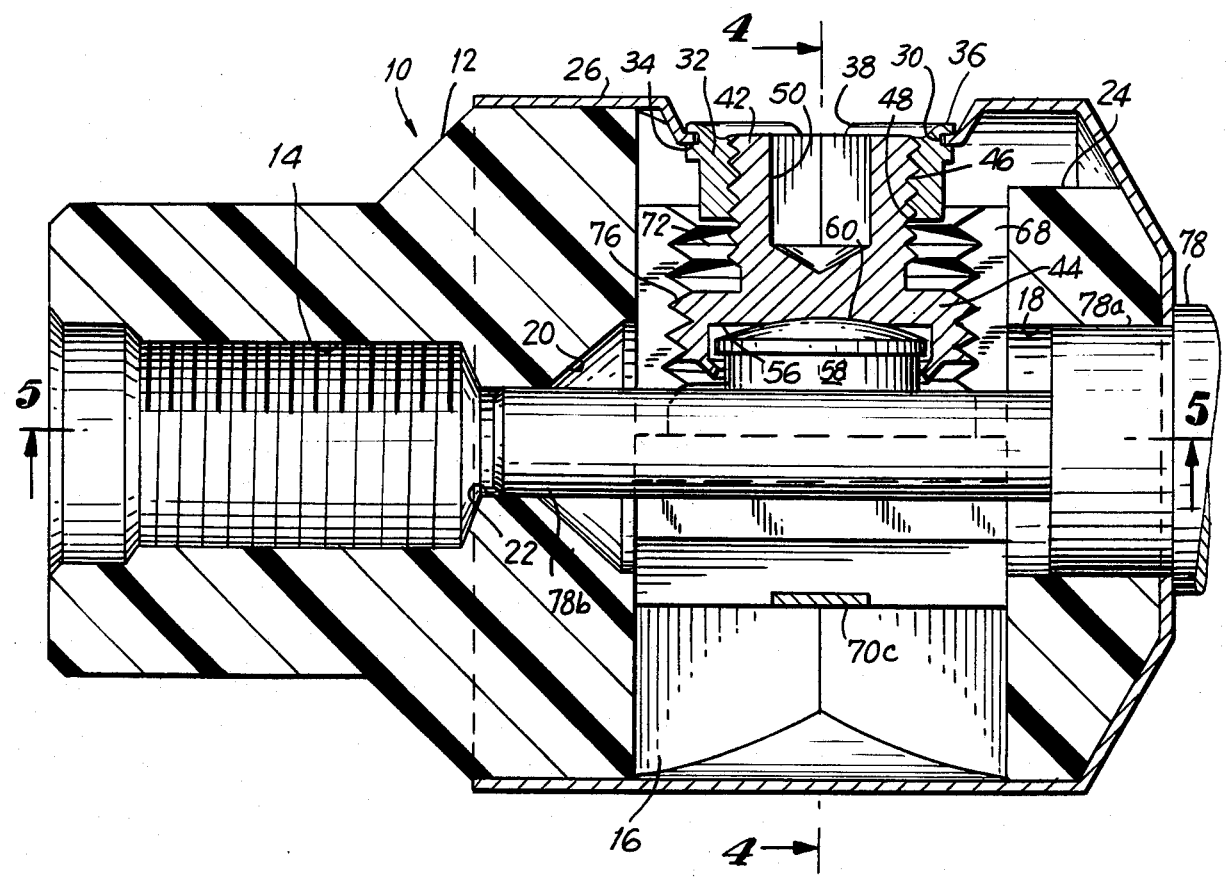

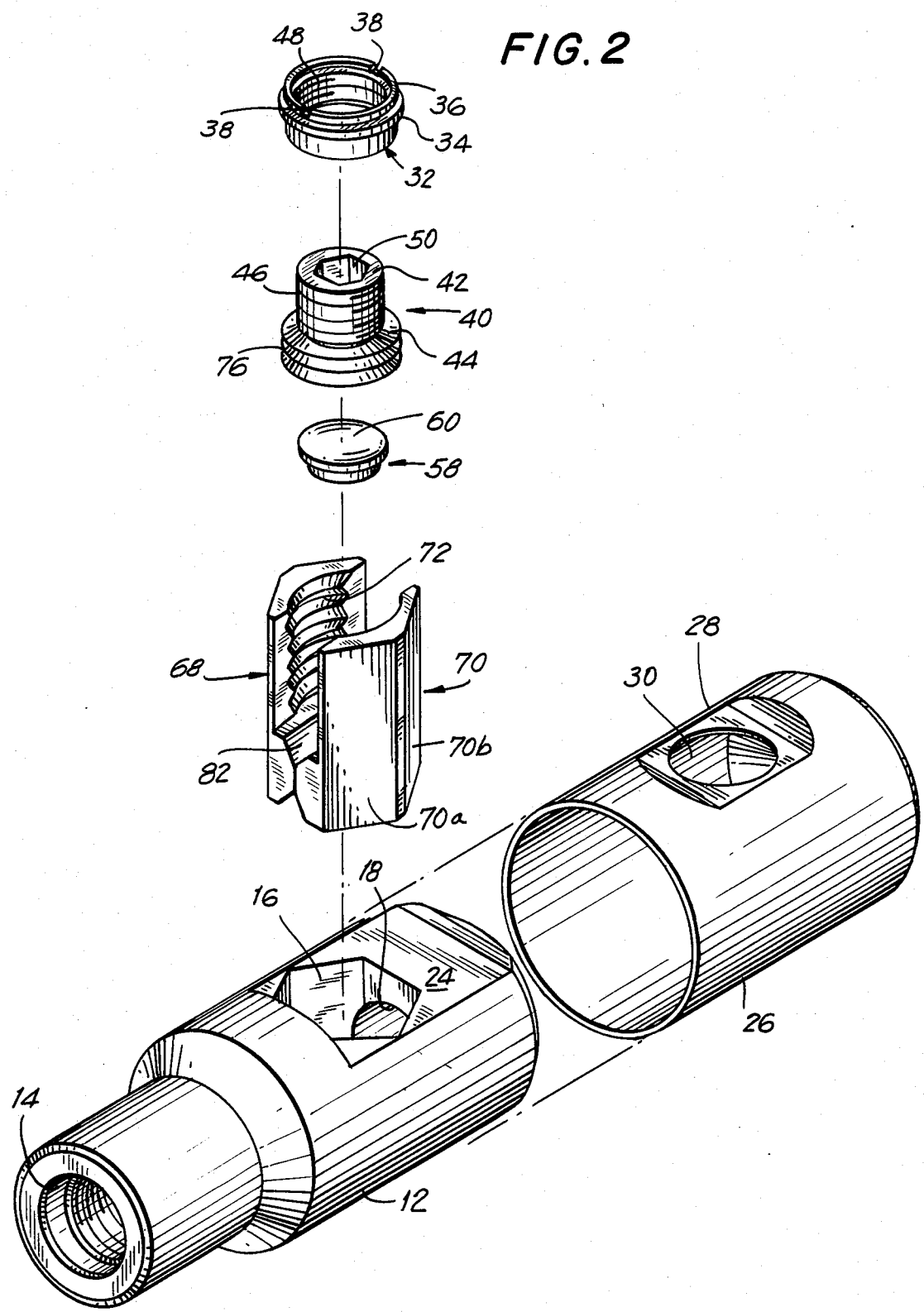

TOOL HOLDER

BACKGROUND OF THE INVENTION

1. Field of the Invention

The present invention relates to a tool holder, such as a chuck, used in connection with a rotary machine such as a drill press, milling machine, lathe, a portable electric or pneumatic machine or a hand drill. More particularly, the invention relates to an improved form of a two-jaw chuck incorporating a differential screw mechanism.

2. Discussion of the Prior Art

The problem of gripping a drill or milling tool in a driven rotary tool holder or chuck typically has been resolved by the use of a so-called three jaw chuck wherein the three jaws are disposed in a circle separated from each other by 120° of arc. In its simplest form, such a chuck may comprise a body having a conical inside surface to support and guide the jaws which may be held apart in a circumferential direction by springs. The chuck body may be threaded onto a drive shaft which also engages the ends of the jaws. Gripping is accomplished by driving the jaws axially as the chuck body is threaded onto the drive shaft. This motion induces a radial component, due to the conical shape of the chuck body, which provides the desired gripping force. Although such chucks are relatively inexpensive they do not have a high degree of precision nor are they capable of exerting high gripping forces on the tool.

Another form of chuck commonly employed is the three jaw geared chuck. This design overcomes the principal problems of the earlier design by providing guideways in the chuck body to control accurately the motion of the jaws and teeth on the jaws which mesh with a gear driven nut mounted on the chuck body. While this design is capable of high precision and adequate gripping force, it comprises a substantial number of precision parts and is therefore relatively expensive to produce.

Despite its cost, the three-jaw geared chuck has proven to be a popular design for drilling machines due to its automatic centering feature, precision and gripping power. However, the art also developed means for self-centering in connection with gripping devices having two jaws. One such means is the differential screw or a screw with left and right hand threads. Such means have been employed in vises and also in tool holders of various designs. Bennett & Dalzell U.S. Pat. No. 31,148 (1861) illustrates the use of a differential screw in a two-jaw tool holder while Butler U.S. Pat. No. 253,581 (1882) discloses a similar mechanism for a hand held vise. Wakeley U.S. Pat. No. 314,087 (1885) discloses a differential screw mechanism for a die or nipple holder while Trout & Ortlip U.S. Pat. No. 318,222 (1885) and Pflugh U.S. Pat. No. 913,912 (1909) use such a mechanism to center a pipe within a pipe threading tool. The use of a differential screw mechanism in various bench vises is disclosed in Werner U.S. Pat. No. 920,797 (1909), Harbord U.S. Pat. No. 1,361,577 (1920), and Rowe et al U.S. Pat. No. 4,208,045 (1980).

Barnes U.S. Pat. No. 335,009 (1886) discloses a differential screw mechanism in connection with a centering or eccentric chuck having two jaws. In common with certain of the prior art patents cited above, the Barnes patent discloses one jaw having a Vee-shaped face while the other jaw is flat thereby providing three point contact with the shank of the tool.

Although the prior art discloses a large number of differential screw mechanisms in connection with vises, tool holders and chucks it is evident that none of them is capable of providing the combination of accuracy and gripping power of the three-saw geared chuck without the relatively high cost associated with that design.

SUMMARY OF THE INVENTION

The principal objct of the present invention is to provide a two-jw type of tool holder of simple design which may be manufactured at a low cost but which has a centering accuracy and gripping power comparable to that of the three-jaw geared chuck. This object is accomplished by providing a body which may be cast or formed from a metallic or plastic material containing ways formed by a transverse polygonal passageway and an axial passageway. A differential screw mechanism is adjustably mounted in the transverse polygonal passageway and cooperates with a split jaw and a faced jaw to provide a rigid, precisely centered location for the tool. Preferably, a special tool is temporarily located in the axial passageway to serve as a center for the final machining of the tool holder, including the forming of the threaded mounting hole, to assure controlled centrality of the special tool (and therefore the tool ultimately held by the tool holder) and the mount for the toolholder. The faced jaw preferably is profiled or provided with a movable gripping button to maximize the gripping torque.

DESCRIPTION OF THE DRAWINGS

Further objects and advantages of the invention will become apparent from the following detailed description and the accompanying drawings in which:

FIG. 1 is a perspective view of a tool holder in accordance with the present invention.

FIG. 2 is an exploded view of a tool holder in accordance witn the present invention.

FIG. 3 is an enlarged longitudinal cross section of the tool holder taken along line 3—3 of FIG. 1.

DETAILED DESCRIPTION OF THE INVENTION

Figure 4:
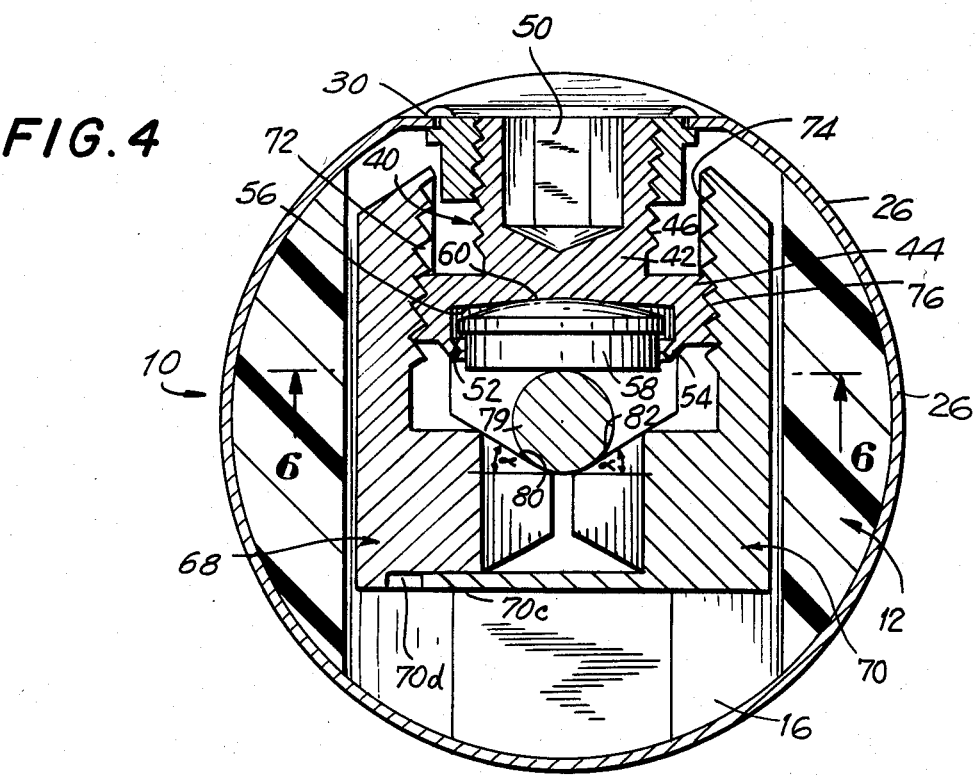
FIG. 4 is a transverse cross section of the tool holder through the differential screw taken along line 4—4 of FIG. 3.

Referring now to the drawings and particularly FIGS. 1, 2 and 3, the tool holder 10 according to the present invention comprises a generally cylindrical body 12 having formed therein an internally threaded mounting hole 14. The mounting hole 14 is selected from a group of standard sizes, such as ⅜" diameter 24 threads per inch or ½" diameter, 20 threads per inch, so that the tool holder 10 may be mounted on a standard machine or hand tool drive shaft. Alternatively, the mounting hole 14 may be machined to a standard taper in order to fit machines provided with tapered drive spindles.

The body 12 may preferably be formed from a molded material such as glass filled nylon in order to minimize weight and machining costs. FIGS. 1-6 illustrate the preferred tool holder having a molded body with a nut attached to the sleeve. FIGS. 7-10 illustrate an alternative form of the tool holder 10 having a die cast or machined metallic body and having the nut attached to the body. Alternatively, the nut may be adhered to the body by bonding or welding it to the molded material.

Figure 5:
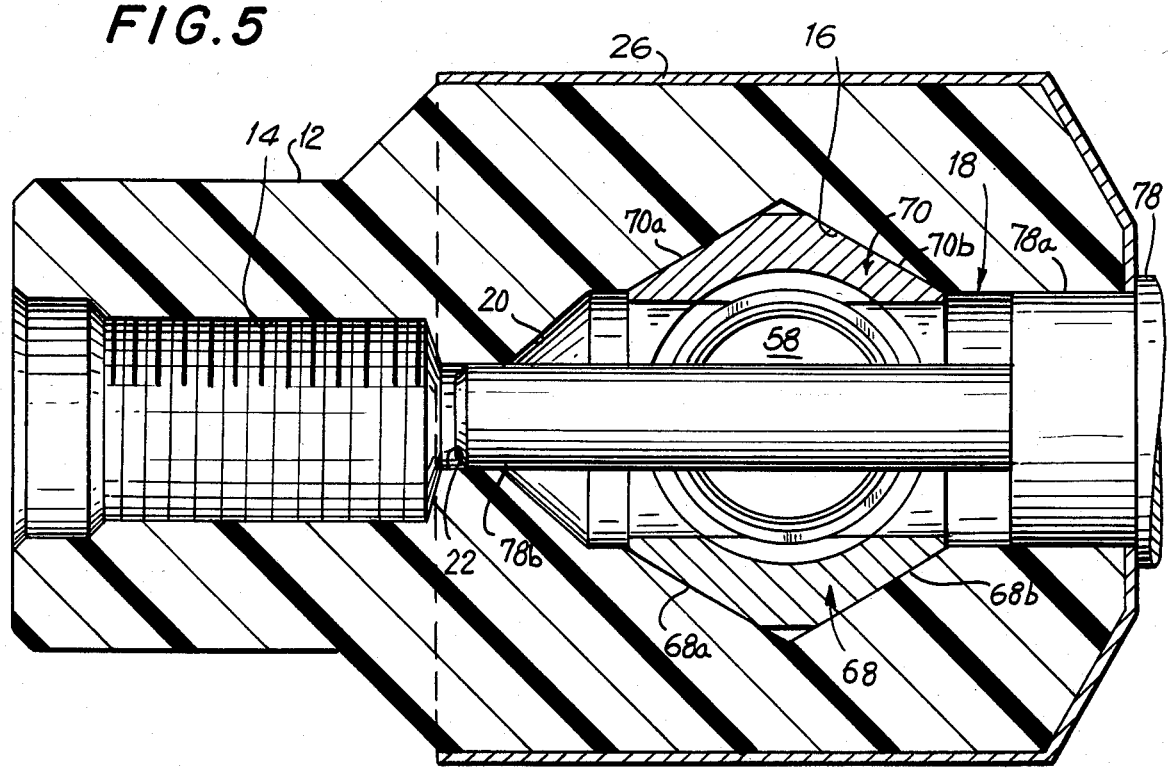
FIG. 5 is a longitudinal cross section of the tool holder taken along line 5—5 of FIG. 3.
Figure 6:
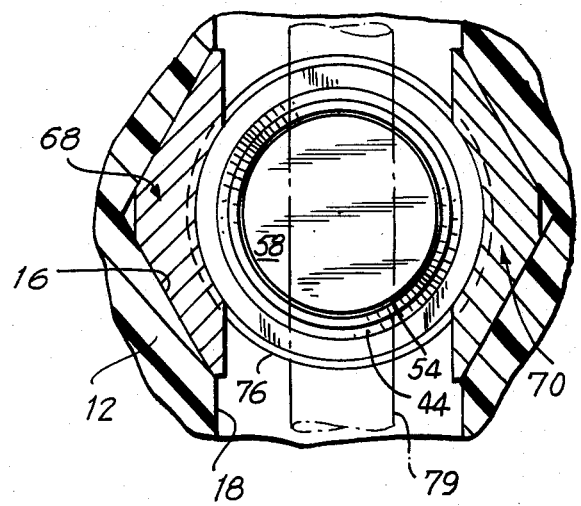
FIG. 6 is a fragmentary longitudinal section of the tool holder showing the faced jaw on the differential screw taken along line 6—6 of FIG. 4.
Figure 7:
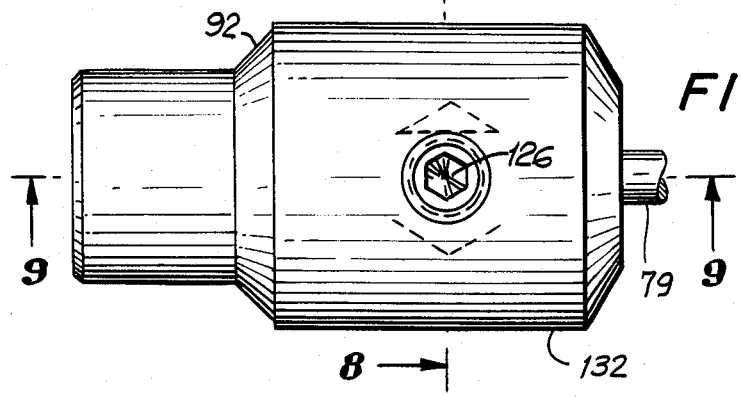
FIG. 7 is a side view of an alternative form of a tool holder in accordance with the present invention.

Ways are formed in the body 12 to guide and position the jaws. This is accomplished by forming transversely through the body 12 a polygonal passageway 16, as is best shown in FIGS. 2 and 5. Preferably the passageway 16 is hexagonal in shape although other polygonal shapes, such as an octagon, are also acceptable. An axial bore 18 is formed in the body 12 and terminates beyond the polygonal passageway 16 in a conical section 20 (FIG. 5). A bore 22 (FIG. 5) smaller in diameter than the axial bore 18 communicates between the mounting hole 14 and the conical section 20 of the axial bore 18. A flat 24 as shown in FIGS. 2 and 3 is formed on the body 12 perpendicular to the axis of the polygonal passageway 16 and extending from the end of the body 12 opposite the mounting hole 14 to the edge of the polygonal passageway 16 to accommodate the differential screw mechanism which will be more fully described hereafter.

Referring to FIGS. 2 and 3, a metal sleeve 26 of generally cylindrical shape is press fitted or otherwise affixed to the body 12. A flat 28 is formed in the wall of the sleeve 26 and located on the axis of the polygonal passageway 16 adjacent the flat 24 on the body 12. A hole 30 is provided in the flat 28 and centered on the axis of the polygonal passageway. A nut 32 having an external shoulder 34 and an upstanding lip 36 is sized to mate with the hole 30 and to be fixedly secured thereto, for example, by swaging, staking, welding, or spinning the lip 36 into engagement with the flat 28 of the sleeve 26. The nut 32 is provided with spanner slots 38 to permit adjustment of the tool holder 10 as described below prior to fixing the nut 32 permanently into the hole 30.

A differential screw element 40 (see FIG. 2) comprises a body portion 42 and a jaw portion 44. External threads 46 are formed on the body portion 42 of the differential screw element 40 which mate with the internal threads 48 of the nut 32. A socket 50 is formed along the axis of the differential screw element 40 to receive an appropriate wrench. Preferably, the socket 50 is hexagonal and sized to receive a standard Allen wrench, although other shapes, such as a square or a screwdriver slot, may also be employed.

As best shown in FIG. 4, the jaw portion 44 of the differential screw element 40 preferably has a bore 52 formed axially thereto and, preferably, a lip 54 surrounding the bore 52. The end 56 of the bore 52 may preferably be conical in shape to provide a seat for jaw piece 58. The inner surface 60 of the jaw piece 58 which contacts the end 56 of the bore 52 is a surface of revolution and preferably comprises a portion of a sphere. As a result of the contrasting shapes of the end 56 of the bore 52 and the inner surface 60 of the jaw piece 58, the area of contact comprises a narrow ring of relatively small diameter. It will be understood that the jaw piece 58 may be placed in the bore 52 of the differential screw element 40 and then the lip 54 (or the end of the screw element if no lip 54 is provided) may be pressed, swaged or otherwise deformed inwardly so as to retain the jaw piece 58 loosely within the bore 52. Whenever a force is applied against the outer surface of the jaw piece 58 the inner curved surface 60 of the jaw piece 58 will automaticay center itself against the conical end surface 56 of the differential screw 40. In addition to the self-centering property of the jaw piece, it is advantageous to make the jaw piece separate from the differential screw element so that, as discussed in more detail below, the differing strength, toughness and hardness requirements for these two parts may best be satisfied and frictional losses minimized.

Figure 8:
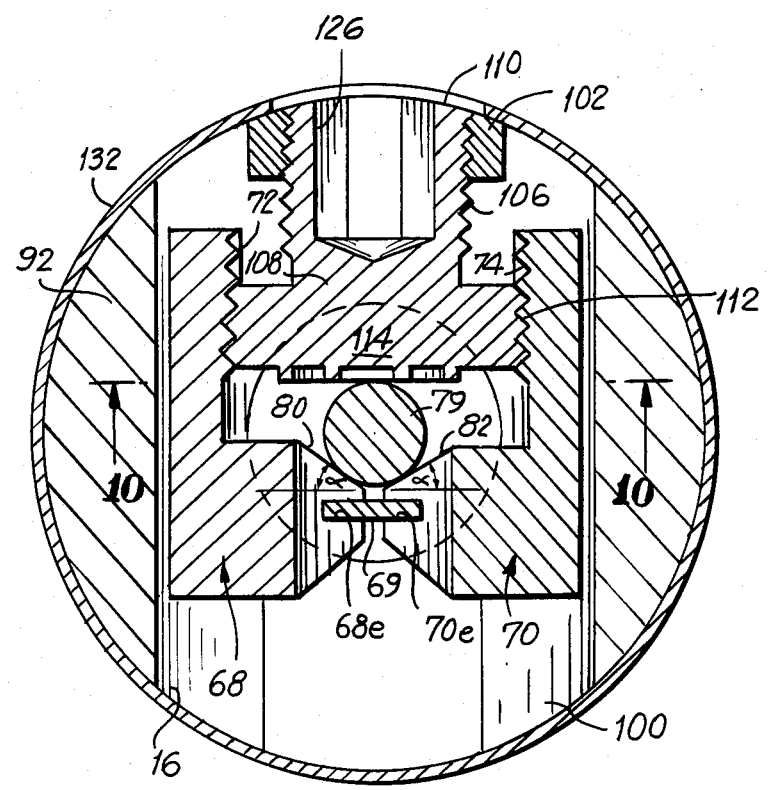
FIG. 8 is an enlarged transverse cross sectional view of the alternative form of the tool holder taken along line 8—8 of FIG. 7.

A pair of anvil pieces 68, 70 are formed so as to mate with each other and the ways formed by the polygonal passageway 16. As shown in FIGS. 2-5 where the polygonal passageway 16 is hexagonal, each anvil piece 68, 70 is formed with exterior surfaces 68a, 68b, and 70a, 70b, (FIG. 5) which slidingly engage the ways which comprise the corresponding surfaces of the polygonal passageway 16. Additionally, alignment means are provided positively to maintain the alignment of the anvil pieces 68, 70 with respect to each other. This means may take the form of a lip 70c, (FIG. 4) formed on each of the anvil pieces 68, 70, for example, which engages a groove 70d formed on the opposing anvil piece 70, 68 so as to prevent relative axial movement of the anvil pieces 68, 70. Alternative alignment means are illustrated in FIG. 8. Such alternative means may comprise one or more keys 69 which are seated in mating cavities 68e, 70e formed in the anvil pieces 68, 70. Internal threads 72, 74 are cut in the anvil pieces 68, 70 to mate with the external threads 76 on the differential screw element 40. The pitch of the threads 46 and 76 on the differential screw element are selected so that the axis of the special tool 78 or tool 79 gripped by jaw piece 58 and the anvil pieces 68, 70, will remain fixed without regard to the diameter of the tool 79 which will typically be a special tool, drill, reamer or mounted grinding wheel.

The selection of the pitches for the threads 46 and 76 will now be explained. If thread 46 on the differential screw is a right hand thread, as is preferable, then clockwise rotation of the differential screw element 40 in the fixed nut 32 will move the differential screw element 40 and its associated jaw piece 58 toward the axis of the tool holder 10. If thread 76 on the differential screw element 40 is also a right hand thread, clockwise rotation of the differential screw will cause the gripping surfaces 80, 82 (FIG. 4) of the anvil pieces 68, 70 to slide within the polygonal passageway 16 toward the axis of the tool holder 10. As best shown in FIG. 4, the gripping surfaces 80, 82 are formed so as to define an angle α with a plane normal to the axis of the differential screw element 40. The pitches of the threads 46 and 76 are selected to satisfy the following formula:

$$\frac{\text{Pitch } 76}{\text{Pitch } 46} = \frac{1}{\cos \alpha} + 1$$

where Pitch 46 is the pitch of thread 46 and Pitch 76 is the pitch of thread 76. It will be appreciated that as the angle α approaches 0° the cosine of α approaches 1 so that the ratio of the pitch of thread 76 to the pitch of thread 46 approaches 2. However, in accordance with the present invention the angle α must be greater than 0°. The angle α may be chosen in the range of 15° to 75° and preferably is about 30° to 60° in order to limit side thrust.

It will be seen, particularly from FIG. 4, that one effect of the angle α is to induce a force normal to the motion of the anvils 68, 70 which forces the anvils 68, 70 against the ways formed by the polygonal passageway 16 thus locking the anvils to the body 12 of the tool holder 10. A second effect of the angle α is to provide three points of contact between the anvils 68, 70 and the jaw piece 58, on the one hand, and the tool 79 being gripped, on the other hand. As shown by FIGS. 4 and 5, the polygonal passageway 16, the anvils 68, 70 and the differential screw element 40 with its jaw piece 58 are symmetrically shaped and the forces balanced so as to center the tool 79 without regard to its diameter. Moreover, when the differential screw 40 is tightened all clearances are taken up and the tool holder becomes an integrated rigid assembly. Due to the symmetrical relationship of the ways formed by the surfaces of the polygonal passageway 16, the anvil pieces 68, 70 will be rigidly held in a position which is centered on the axis of the polygonal passageway 16 when a tightening or gripping force is applied. Similarly due to the angular disposition of the gripping surfaces 80, 82 of the anvil pieces 68, 70 and the self-centering feature of the jaw piece 58, the tool 79 gripped by the tool holder 10 will be precisely perpendicular to the axis of the polygonal passageway 16.

An operating requirement of the tool holder 10 is that a coaxial relationship be established between the tool 79 and the tool holder 10. This requirement, preferably, is attained in the present invention by the sequence in which the tool holder is formed and assembled. First, the body 12 is cast, molded or machined to the desired shape and the axial bores 18 and 22 and the transverse polygonal passageway 16 are formed therein. The nut 32, differential screw element 40 (with its jaw piece 58) and the anvil pieces 68, 70 (see FIG. 4) are assembled and located on the ways of the polygonal passageway 16. Next the sleeve 26 is pressed on to the body 12. Thereafter, the special tool 78 (FIGS. 3 and 5) is inserted into the body 12. Special tool 78 is provided with a pilot 78a sized to fit closely within the axial bore 18 and a coaxial body portion 78b sized to fit closely within bore 22. It will thus be appreciated that special tool 78 will be coaxial with the bores 18 and 22. Thereafter, the differential screw element 40 is tightened so that the anvil pieces 68, 70 and the jaw piece 58 grip the special tool 78 securely. The nut 32 is then adjusted so that the collar 34 (FIGS. 3 and 4) engages the sleeve 26 and the upstanding lip 36 extends through the hole 30 of the sleeve 26. Finally, the upstanding lip 36 is swaged or otherwise deformed or welded so as to rigidly and permanently affix the nut 32 to the sleeve 26.

The tool holder 10 with the special tool 78 gripped therein may then be chucked in a lathe or horizontal boring machine and the threaded mounting hole 14 bored and tapped. It will be appreciated that this sequence of operations assures that when the tool holder 10 is mounted on an appropriate drive shaft (not shown) by means of the internally threaded mounting hole 14, the tool 79 gripped in the tool holder 10 will be coaxial with the drive shaft within a very small tolerance.

FIGS. 7 through 10 disclose an alternative construction for the tool holder wherein the body configuration is such that the nut can be affixed to the body. In this embodiment, as will be set forth in more detail below, the body 92, usually formed from a metallic material, can accommodate and restrain the nut 102 and the sleeve 132 merely provides a finished and unbroken appearance for the tool holder by covering the ends of the polygonal passageway 100. If the body 92 is formed from a plastic material the nut 102 may be affixed thereto by, for example, ultrasonic welding.

Figure 9:
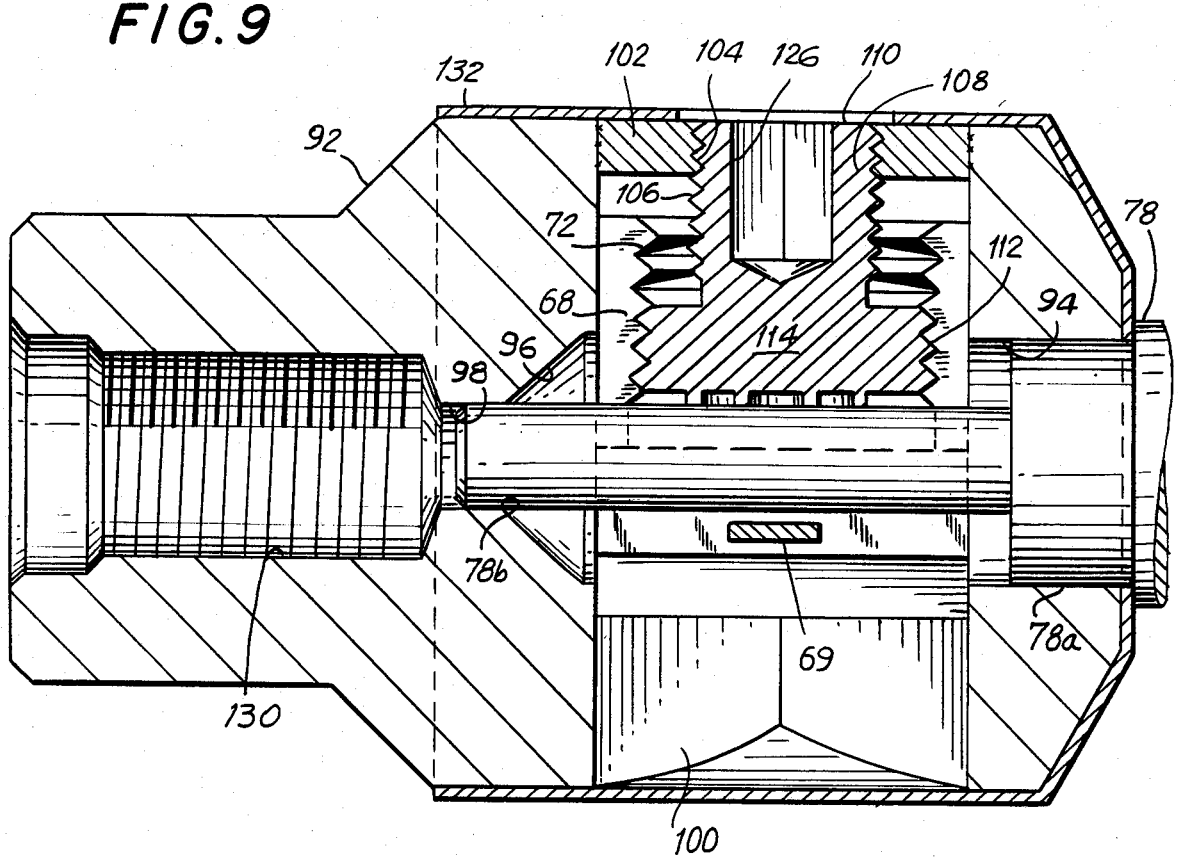
FIG. 9 is an enlarged longitudinal cross section of the alternative form of the tool holder taken along line 9—9 of FIG. 7.

Referring particularly to FIGS. 8 and 9, the body 92 may be rough machined from a bar or casting. An axial bore 94 ending in a conical section 96 and a reduced bore 98 is first formed in the body 92. Thereafter ways are produced by forming a polygonal passageway 100 in the body 92 normal to the bore 94. The polygonal passageway 100 is preferably hexagonal in cross section but may also, for example, be octagonal. A nut 102, which preferably is rectangular in shape is sized to slide within the polygonal passageway 100. The nut 102 is restrained by the walls of the passageway 100 from turning. The nut 102 is provided with internal threads 104 which mate with external threads 106 located on the body portion 108 of the differential screw 110. External threads 112 on the jaw portion 114 of the differential screw 110 mate with internal threads 72, 74 on the anvil pieces 68, 70 which slide within the polygonal passageway 100. Each anvil piece 68, 70 is provided with a gripping surface 80, 82, which is disposed at an angle α to a plane normal to the axis of the polygonal passageway 100. A socket 126, preferably hexagonal in cross section, is located in the body portion 108 of the differential screw 110 to receive an appropriate actuating wrench (not shown).

In a manner analogous to that described above, a special tool 78, having a pilot 78a sized to fit closely with the bore 94 and a coaxial body portion 78b sized to fit closely within the bore 98 may be placed in the body 92 to align the parts. The differential screw 110, when tightened, establishes the proper alignment of the anvil pieces 68, 70 and the differential screw 110. Thereafter, nut 102 may be welded, staked or otherwise adhered to the body 92 so as to fix permanently the proper relationship between the gripping surfaces 80, 82, the differential screw 110, the axis of the tool 78 and the body 92. Thereafter, the special tool 78 gripped in the body 92 may be chucked in a lathe or horizontal boring machine and the body 92 finish machined to size. During this machining operation the threaded mounting bore 130 may be formed in the end of the body 92 opposite the special tool 78.

A sleeve 132 is then pressed over the body 92 to provide a finished appearance and to cover the open ends of the polygonal passageway 100 except for the socket 126.

It will be understood that the relationship between the pitches of the threads 106 and 112 on the differential screw 110 and the angle α of the gripping surfaces 80, 82 of the anvil pieces 68, 70 are as described in connection with FIGS. 1-6. Similarly, while a one piece differential screw and jaw assembly has been shown in FIGS. 8-10, the assembly as shown in FIGS. 2-6 may also be used. Axial misalignment of the anvil pieces 68, 70 may be prevented by the lips 70c and grooves 70d as shown in FIG. 4 or the key 69 and cavities 68e, 70e as shown in FIG. 8.

It is, of course, apparent that minimum eccentricity and wobble between the tool and the axis of the tool holder is a desirable and necessary characteristic of a high quality tool holder. Such eccentricity and wobble may result from machining tolerances in the screw threads and other parts and necessary clearances between moving parts. An eccentricity of not more than 0.0075 inches is a requirement for tool holders of the type here involved. The standard three-jaw geared chucks are capable of attaining such eccentricity tolerances but two-jaw chucks heretofore known, such as the chuck of the Barnes U.S. Pat. No. 335,009 cited above, are incapable of meeting such a tolerance since they provide no means to compensate for thread machining tolerances and clearances between moving parts. Additionally, chucks like those of the Barnes U.S. Pat. No. 335,009 have a limited degree of rigidity resulting from the clearances which are inherent in, and necessary to, the design. Such looseness may lead to wear, inaccuracy and premature failure. In accordance with the present invention, the eccentricity tolerances, rigidity, durability and gripping ability of a three-jaw geared chuck are attained with a simple and inexpensive two-jaw design.

Another important characteristic of a tool holder is the slip torque which can be produced by a given tightening torque. Slip torque is the torque measured, for example, in pound-inches, which will cause the tool to slip or rotate relative to the tool holder. Tightening torque, also measured, for example, in pound-inches, is the torque applied by a key or wrench to tighten the jaws of the tool holder. For tool holders designed for machine or hand tools wherein the tightening torque is applied by hand using a small chuck wrench, the maximum practical tightening torque is about 120 pound-inches and it is desired that this translate into the maximum possible slip torque. In general, the slip torque represents some fraction of the tightening torque, a portion of the tightening torque having been expended in frictional losses within the mechanism during the tightening process.

It will be appreciated that the maximum frictional force between two parts capable of sliding relative to each other is a function of the force normal to the sliding surfaces which presses one surface against the other and the coefficient of friction between those surfaces. In the present case, one of the surfaces is the shank of the tool 79 which will usually be a carbon steel drill rod. The other surface, in the present case, is the jaw portion of the differential screw element and the anvils. Because of the toughness and strength requirements for the threaded portions of the differential screw element, its hardness is limited to about Rockwell C 39-43. In order to increase the slip torque without increasing the tightening torque, the present invention minimizes frictional losses in the mechanism related to the tightening operation while improving the durability of the mechanism. One approach to this problem is to concentrate the area of the face of the differential screw 110 (FIG. 8) to permit limited elastic deformation during the tightening operation. To accomplish this, one or two circular ribs 116, 118 may be provided on the tool-engaging face of the differential screw element. Another approach involves the introduction of a jaw piece 58 freely mounted in the tool-engaging face of the differential screw 40 and rotatable with respect thereto (FIG. 4). By providing a conical surface on the differential screw 40 and a spherical surface in he jaw piece 58 a limited area of contact near the axis of the differential screw is established so that during tightening, relative motion occurs between the differential screw 40 and the jaw piece 58 in preference to relative motion between the jaw piece 58 and the tool 79. By providing a separate jaw piece it is feasible to harden the jaw piece 58 to the range $R_c$ 54-58 and thereby increase the durability of the working face of the jaw.

Figure 10:
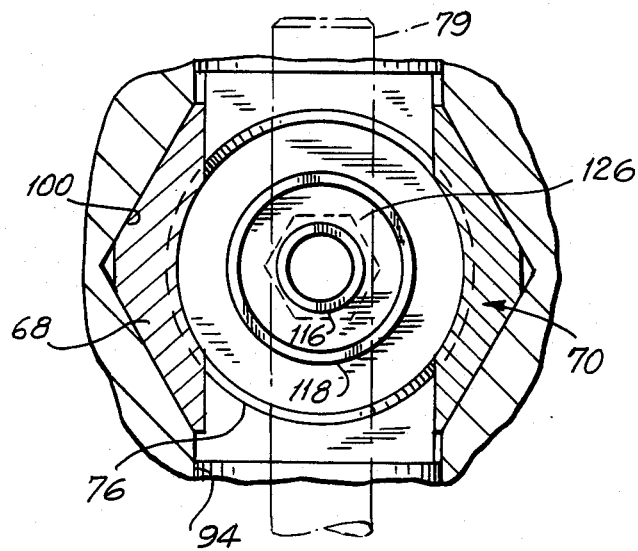
FIG. 10 is fragmentary longitudinal section of the tool holder showing a jaw face formed on the differential screw.
Figure 11:
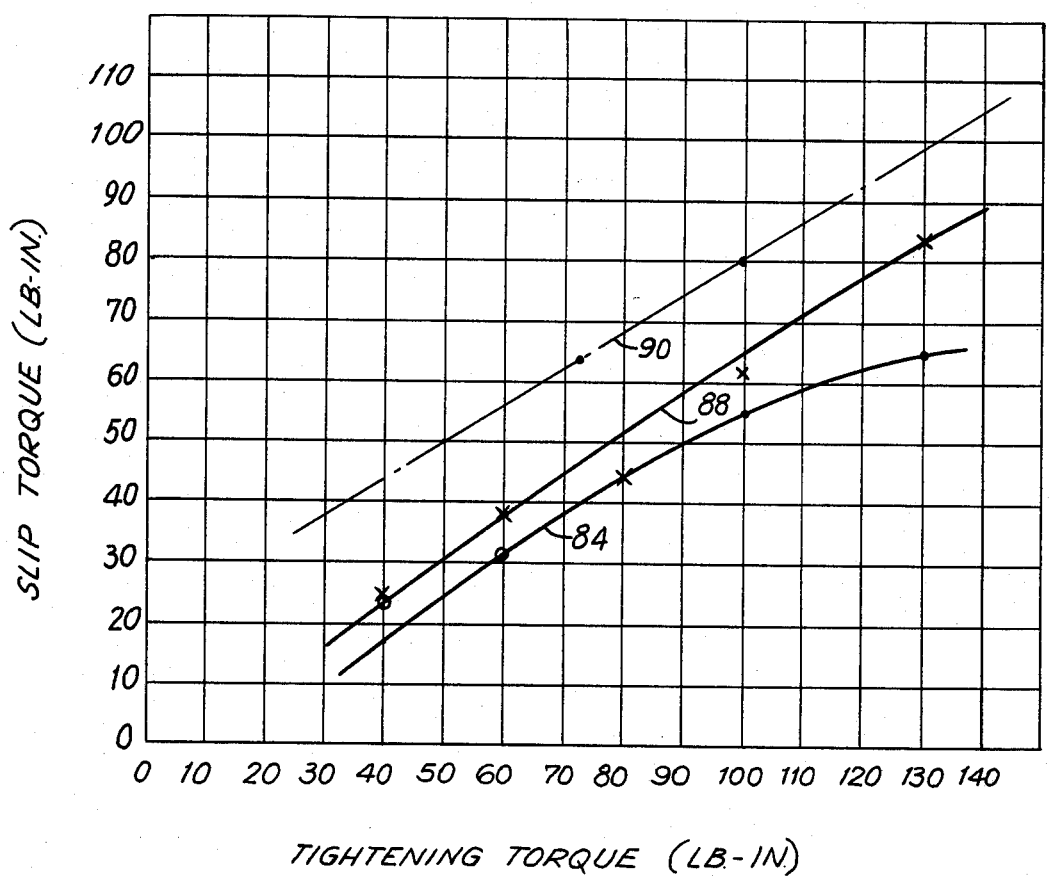
FIG. 11 is a graph showing the tool holder slip torque resulting from a range of tightening torques for tool holders with different face configurations.

The effects of these alternative designs are illustrated in FIG. 11 which is a graph plotting, as the abscissa, the tightening torque in pound-inches and, as the ordinate, the resulting slip torque, also in pound-inches. Curve 84 shows the slip torque produced by a design incorporating a differential screw having a flat jaw face and no separate jaw piece 58. Curve 88 shows the improved performance produced by the annular ribs 116, 118 as shown in FIGS. 8, 9 and 10. A further improvement in the resultant slip torque is indicated by curve 90 which represents the configuration shown in FIGS. 2-6 wherein a movable jaw piece 58 with a flat working face is positioned in the differential screw 40.

The terms and expressions which have been employed are used as terms of description and not of limitation and there is no intention in the use of such terms and expressions of excluding any equivalents of the features shown and described or portions thereof, but it is recognized that various modifications are possible within the scope of the invention.

What is claimed is:

1. A tool holder comprising a substantially cylindrical body portion having an axial bore formed therethrough and mounting means formed at one end thereof, ways formed through said body in a direction transverse to said axial bore, the axis of said ways located normal to the axis of said body and intersecting the axis of said body, a pair of separate but mating anvil pieces having exterior surfaces formed to slidingly engage respective internal surfaces of said ways and gripping surfaces disposed at an angle $\alpha$ to a plane parallel to said axis of said body and normal to the axis of said ways, said angle $\alpha$ being an angle in the range of 15° to 75°, said pair of mating anvil pieces having formed thereon internal threads of a first pitch, a differential screw element having at one end external threads of a first pitch for engagement with said internal threads on said pair of mating anvil pieces, said differential screw element having formed on the opposite end thereof and coaxial with said external threads of a first pitch external threads of a second pitch, nut means adjustably fixed relative to said body means and having formed therein internal threads of a second pitch for engagement with said external threads of a second pitch formed on said differential screw element, said differential screw element having jaw face means formed on said one end, said threads of a first and second pitch and said angle $\alpha$ being related by the formula:

$$\frac{\text{First Pitch}}{\text{Second Pitch}} = \frac{1}{\cos \alpha} + 1$$

2. A tool holder as described in claim 1 and comprising, in addition, a sleeve encompassing at least part of said body portion of tool holder.

3. A tool holder as described in claim 2 in which said sleeve is metallic and said nut means is adjustably affixed to said metallic sleeve.

4. A tool holder as described in claim 1 and comprising, in addition, means preventing relative motion of said mating anvil pieces in a direction parallel to the axis of said ways.

5. A tool holder as described in claim 4 in which said means preventing relative motion of said mating anvil pieces comprises a lip on each of said anvil pieces adapted to engage the other of said anvil pieces.

6. A tool holder as described in claim 4 in which said means preventing relative motion of said a mating anvil pieces comprises at least one key adapted to seat in a mating cavity formed in each of said mating anvil pieces.

7. A tool holder as described in claims 1, 3, 4, 5 or 6 wherein said jaw face means on said differential screw element comprises a flat surface formed normal to the axis of the said differential screw element.

8. A tool holder as described in claims 1, 3, 4, 5 or 6 wherein said jaw face means on said differential screw element is provided with at least one circular rib.

9. A tool holder as described in claims 1, 3, 4, 5 or 6 in which the end of the said differential screw element adjacent the axis of the tool holder is provided with an axial bore and comprising, in addition, a jaw piece loosely positioned in said axial bore.

10. A tool holder as described in claims 1, 3, 4, 5 or 6 in which the end of said differential screw element adjacent the axis of the tool holder is provided with an axial bore, said axial bore having a conical base with its apex located in the axis of said differential screw element and wherein said jaw face means comprises a jaw piece loosely positioned in said axial bore, said jaw piece having a flat surface formed on one side thereof and a surface of revolution formed in the opposite side, said surface of revolution located adjacent the conical base of said axial bore.

11. A tool holder as described in claims 1, 3, 4, 5 or 6 in which the end of said differential screw element adjacent the axis of the tool holder is provided with an axial bore, said axial bore having a conical base with its apex located on the axis of said differential screw element and wherein said jaw means comprises a jaw piece loosely positioned in said axial bore, said jaw piece having at least one circular rib formed on one side thereof concentric with the axis of said jaw piece and having a surface of revolution formed on the opposite side, said surface of revolution located adjacent the conical base of said axial bore.

12. A tool holder as described in claims 1, 3, 4, 5 or 6 in which the angle α is in the range of about 30° to 60°, the end of said differential screw element adjacent the axis of the tool holder is provided with an axial bore, said axial bore having a conical base with its apex located in the axis of said differential screw element and wherein said jaw face means comprise a jaw piece loosely positioned in said axial bore, said jaw piece having a flat surface formed on one side thereof and a spherical surface formed on the opposite side, said spherical surface located adjacent the conical base of said axial bore.

13. A tool holder as described in claim 2 in which said nut means is adjustably affixed to said body portion.

14. A tool holder as described in claim 13 in which said jaw face means on said differential screw element comprises a flat surface formed normal to the axis of said differential screw element.

15. A tool holder as described in claim 13 in which said jaw face means on said differential screw element is provided with at least one circular rib concentric with the axis of said differential screw element.

16. A tool holder as described in claim 13 in which the end of said differential screw element adjacent the axis of the tool holder is provided with an axial bore and wherein said jaw face means comprises a jaw piece loosely positioned in said axial bore.

17. A tool holder as described in claim 16 in which said axial bore has a conical base with its apex located on the axis of said differential screw element, said jaw piece having formed on one side thereof a flat surface and on the opposite side a surface of revolution, said surface of revolution located adjacent the conical base of said axial bore.

18. A tool holder as described in claim 13 in which the end of said axial bore has a conical base with its apex located on the axis of said differential screw element, said jaw piece having formed on one side thereof at least one circular rib concentric with the axis of said jaw piece and on the opposite side a surface of revolution, said surface of revolution located adjacent the conical base of said axial bore.

19. A tool holder as described in claim 17 in which the angle α is in the range of about 30° to about 60° and the surface of revolution is a spherical surface.

20. A tool holder as described in claims 13, 14, 15, 16, 17, 18 or 19 and comprising, in addition, means preventing relative motion of said mating anvil pieces in a direction parallel to the axis of said polygonal passageway.

21. A tool holder as described in claims 13, 14, 15, 16, 17, 18 or 19 and comprising, in addition, a lip on each of said anvil pieces adapted to engage the other of said anvil pieces whereby relative motion of said mating anvil pieces in a direction parallel to the axis of said ways is prevented.

22. A tool holder as described in claims 13, 14, 15, 16, 17, 18 or 19 and comprising, in addition, at least one key adapted to seat in mating cavities formed in each of said mating anvil pieces whereby relative motion of said mating anvil pieces in a direction parallel to the axis of said ways is prevented.

* * * * *